United States Patent
Henneken et al.

(10) Patent No.: US 6,487,485 B1
(45) Date of Patent: Nov. 26, 2002

(54) METHOD FOR CONTROLLING AN AUTOMATIC GEARBOX

(75) Inventors: Markus Henneken, Kressbronn (DE); Friedemann Jauch, Meckenbeuren (DE); Kai-Uwe Herbster, Friedrichshafen (DE); Franz-Josef Schuler, Kressbronn (DE); Thomas Mauz, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/807,911

(22) PCT Filed: Oct. 16, 1999

(86) PCT No.: PCT/EP99/07857

§ 371 (c)(1),
(2), (4) Date: Apr. 19, 2001

(87) PCT Pub. No.: WO00/25043

PCT Pub. Date: May 4, 2000

(30) Foreign Application Priority Data

Oct. 24, 1998  (DE) ......................... 198 49 062

(51) Int. Cl.$^7$ ..................... G06F 15/00; G06F 17/00
(52) U.S. Cl. ................................ 701/56; 701/70
(58) Field of Search ................. 701/56, 64, 70, 701/79, 94, 95

(56) References Cited

U.S. PATENT DOCUMENTS

| | | | |
|---|---|---|---|
| 4,724,723 A | * 2/1988 | Lockhart et al. | ............ 477/102 |
| 5,152,192 A | 10/1992 | Koenig et al. | ................ 74/862 |
| 5,369,581 A | * 11/1994 | Ohsuga et al. | ........... 280/5.504 |
| 5,411,449 A | 5/1995 | Takahashi et al. | .......... 477/120 |
| 5,674,151 A | * 10/1997 | de Schepper et al. | ....... 477/120 |
| 5,730,680 A | * 3/1998 | Toukura | ....................... 477/45 |
| 5,774,820 A | * 6/1998 | Linden et al. | .............. 180/179 |
| 6,076,032 A | * 6/2000 | Kuroda et al. | ................ 477/97 |
| RE37,598 E | * 3/2002 | Toukura et al. | ................ 477/40 |

FOREIGN PATENT DOCUMENTS

| | | |
|---|---|---|
| DE | 35 39 684 A1 | 5/1986 |
| DE | 43 33 583 A1 | 4/1994 |
| DE | 43 34 146 A1 | 4/1994 |
| EP | 0 635 659 A2 | 1/1995 |

* cited by examiner

Primary Examiner—William A. Cuchlinski, Jr.
Assistant Examiner—Olga Hernandez
(74) Attorney, Agent, or Firm—Davis & Bujold, P.L.L.C.

(57) ABSTRACT

The invention relates to a method for controlling an automatic transmission wherein several shift programs are provided and allocated to specific values of a driving activity characteristic (FAKG) and in each shift program shifting characteristic lines and shifting rotational speeds are determined by accelerator pedal positions. The shifting rotational speeds are immediately increased to higher rotational speeds when the driver quickly depresses the accelerator pedal causing the accelerator pedal position gradient to exceed a presettable limit value. According to the invention, it is proposed that the shifting rotational speeds be determined according to the actual value of the driving activity characteristic by interpolation between shifting characteristic lines from two respective adjacent shift programs and the driving activity characteristic be immediately increased by a presettable offset amount when the accelerator pedal position gradient exceeds the presettable limit value.

11 Claims, 1 Drawing Sheet

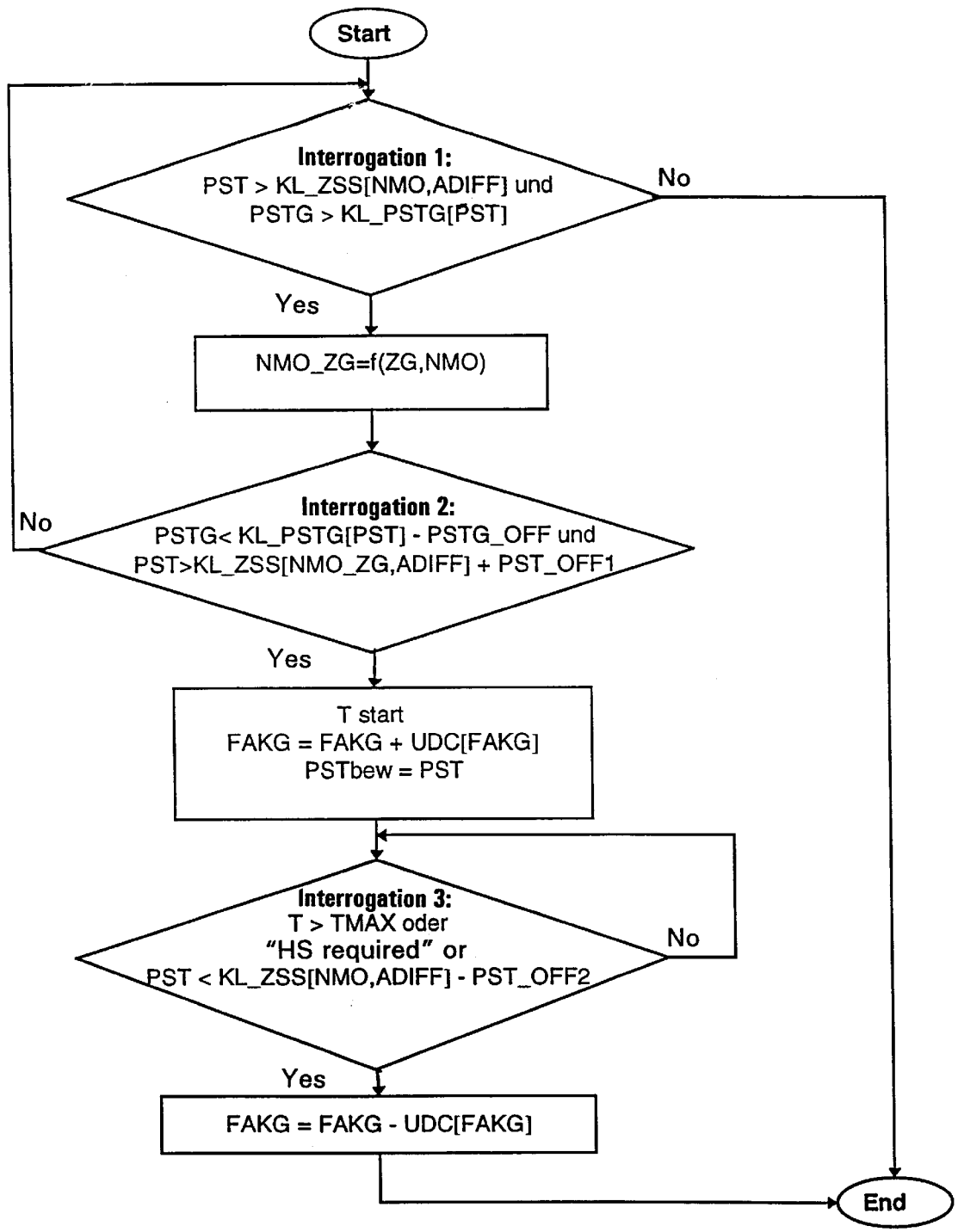

METHOD FOR CONTROLLING AN AUTOMATIC GEARBOX

FIELD OF THE INVENTION

The invention relates to a method for controlling an automatic transmission.

BACKGROUND OF THE INVENTION

In modern electronic controls for automatic transmissions, several shift programs are usually stored which cover the range from consumption-optimized to performance-optimized, sporting drive mode, with several intermediate steps. A shift program is usually presented as a set of shift characteristic lines. Each shift characteristic line contains for a specific gear change (e.g. from third to fourth gear) information as to the speed or rotational speed and load input or accelerator pedal position which the gear must be changed.

A consumption-optimized shift program stands out by the fact that also at relatively high accelerator pedal positions a gear is shifted to the relevant next higher gear already at relatively low rotational speeds and that downshifts are triggered at low rotational speeds or only at relatively high load inputs. In performance-optimized or sporting shift program, upshifts are triggered only at high shift rotational speeds so that the separate gears are further recessed. Downshifts also occur at high rotational speeds. Downshifts are already triggered at medium accelerator pedal position.

From the shift program, stored in the electronic control, the shift points are automatically selected at each moment depending on a driving activity characteristic. The driver is hereby unburdened from the formerly customary manual shifting between a consumption-optimized "E" shift program and a performance optimized "S" shift program.

EP 0 694 138 B1 discloses a method for determining the driving activity characteristic which is formed according to a selector lever activity, an engine torque surplus, to curve radius and the driver's braking activity. It can assume any values between a consumption-optimized minimum value and a performance-optimized maximum value. The driving activity characteristic is usually changed very slowly, but in certain situations, it is desired very rapidly to arrive at a sporting drive program from a former consumption-optimized drive program.

DE 39 22 051 C2 discloses a method in which the performance-optimized shift program is selected as soon as the gradient of the signal value of the accelerator pedal position exceeds a limit value. The performance-optimized shift program is obtained either directly or via an intermediate step in which the next sporting shift program is first selected. The previously selected shift program is returned to when the signal value of the throttle valve is throttled back by a certain value. This method is suitable for spontaneously making available for a driver a sporting shift program with high shift rotational speeds and, accordingly, high traction surpluses, which can be desired, e.g. during an overtaking operation.

However, depending on the current driving state, in this method it is possible that the driver encounters unexpected behavior of the automatic transmission.

The generic DE 35 39 684 A discloses a method for control of an automatic transmission controlled by an electronic control unit. In the electronic control unit several shift programs are stored which are associated with specific values of a driving activity characteristic. In each shift program the shifting rotational speeds, an accelerator pedal position gradient being determined form an accelerator pedal position signal. When the accelerator pedal position gradient exceeds a presettable limit value upon a quick depression of the accelerator pedal, the shifting rotational speeds are immediately increased to higher rotational speeds.

The problem on which the invention is based is to provide a method with which it is possible more flexibly to react to the driver's wish according to the driving state.

SUMMARY OF THE INVENTION

According to the invention, the quick depressing of the accelerator pedal does not result in that a certain discrete shift program be selected. The driving activity characteristic, rather, is immediately increased by a preset offset. amount. By the fact that the actual shift rotational speeds, depending on the actual value of the driving activity characteristic, are determined by interpolation between shift characteristic lines from two respective adjacent shift programs, intermediate shift programs are produced almost at will between the discrete shift programs.

In an advantageous development of the method, traction or coast operation is recognized in the electronic control— at least depending on the accelerator pedal position. The driving activity characteristic is only increased by the predetermined offset value with the accelerator pedal position reached at the end of the quick depression when traction operation is recognized. In a situation where in the coast operation the accelerator pedal is briefly touched without going over to the traction operation, undesired high rotational speeds are thus prevented.

Likewise, undesired is when due to the quick depression, a downshift is triggered and coating operation prevails in the target gear or only a very weak traction abuts. An advantageous development of the inventive method provides that in the electronic control it is recalculated whether a downshift would be triggered if the driving activity characteristic were increased by the predetermined offset amount and what target gear would be introduced after the downshift. It is tested whether the accelerator pedal position is about the traction-coast characteristic line in the target gear. The driving activity characteristic is increased by the predetermined offset amount only when in the target gear traction operation is recognized with certainty with the accelerator pedal position reached at the end of the depression.

At the end of the quick depression can then advantageously be recognized, if the accelerator pedal position is lower by a presettable amount than the limit value at which the shift rotational speeds are moved to higher rotational speeds that the movement, therefore, has again slowed down.

The exit from the function in which the driving activity characteristic has again been reduced by the same offset amount by which is had previously been increased advantageously takes place when the actual accelerator pedal position is lowered by a certain amount than the accelerator pedal position reached at the end of the quick depression when coast operation is safely recognized or when predetermined time has elapsed since the increase of the driving activity characteristic. When the driver has throttled back to the accelerator pedal position or changed to the coast operation, it can be concluded that the increased traction requirement is no longer present. A more reliable exit from the function occurs after expiration of the presettable time.

In an alternative development, the function is abandoned when an upshift is required, when coast operation is safely recognized, or when the presettable time after increase of the driving activity characteristic has elapsed. As long as the vehicle remains in traction operation, a brief throttling back of the accelerator pedal position does not result in this development in abandonment of the function which could be disturbing if thereby an undesired upshift is triggered.

A more flexible adaptation to the current driver type can be obtained when the presettable time since the increase of the driving activity characteristic depends on the actual value of the driving activity characteristic. The values, for example, can be stored in a characteristic line and are lower for a consumption-oriented drive than for a performance-oriented driver.

It also can be advantageous if the offset amount depends on the actual value of the driving activity characteristic. Hereby can be obtained, for example, that starting from the consumption-optimized shift program there also is obtained a sufficiently great displacement of the shift points in direction to the higher shift rotational speeds.

The operation of the quick depressing of the accelerator pedal can be differently evaluated when the offset amount depends on the determined value of the accelerator pedal position gradients. To higher values of the accelerator pedal position gradient are for this purpose assigned in a characteristic line higher values for the offset amount.

When the limit value for the accelerator pedal position gradients depends on the actual value of the accelerator pedal position, the electronic control can react differently depending on how far the accelerator pedal was depressed. When, for example, with the limit value for the accelerator pedal position gradients for low accelerator pedal positions higher values are associated, thereby can be prevented an undesired triggering of the function with low accelerator pedal position. For the inventive method, it is necessary reliably to differentiate from each other the states "traction operation" and "coast operation". The presence of traction operation can be recognized with greater certainty when he accelerator pedal position is higher by a certain amount than a traction-coast characteristic line. Accordingly, it is possible with greater certainty to recognize coast operation when the accelerator pedal position is lower by a certain amount than the traction-coast characteristic lines.

BRIEF DESCRIPTION OF THE DRAWING(S)

The invention is explained with reference to a program flow chart of an embodiment of the method according to the single FIGURE.

DETAILED DESCRIPTION OF THE INVENTION

In the inventive method an actual value PST is constantly detected for the accelerator pedal position. As a sensor serves a potentiometer coupled with the accelerator pedal. From the signal is constantly determined an actual value PSTG for the accelerator pedal position gradients. From a traction-coast line stored in the electronic control a limit value KL_ZSS for the accelerator pedal position is constantly determined which depends on the rotational speed NMO and a road-gradient dependent variable ADIFF. Above said limit KL_ZSS traction operation is recognized and below it coast operation. For the accelerator pedal position gradients a limit value KL_PSTG is likewise determined which depends on the accelerator pedal position PST. In the first interrogation block (interrogation 1) the actual value PST for the accelerator pedal position is compared with the limit value KL_ZSS for the accelerator pedal position and the actual value PSTG for the accelerator pedal position gradients is compared with the limit value KL_PSTG for the accelerator pedal position gradients. When the actual value PST is higher than the limit value KL_ZSS, i.e. traction operation in the actual gear can be recognized, and the actual value PSTG is higher than the limit value PSTG, i.e. a spontaneous traction requirement can be recognized, it is first recalculated whether a downshift would be triggered if the driving activity characteristic FAKG were increased by a presettable offset amount UDC, which target gear ZG would be introduced after the downshift and what engine rotational speed NMO_ZG would be reached in the target gear, the engine rotational speed NMO_ZG depending on the actual engine rotational speed NMO and the ratio of the target gear.

In the second interrogation block (interrogation 2) is tested whether the actual value PSTG of the accelerator pedal position gradients is lower than the limit value KL_PSTG deducting a presettable amount PSTG_OFF. If this is the case, the end of the depression of the accelerator pedal is recognized. When the actual value PST of the accelerator pedal position is reacted still is higher than the limit value KL_ZSS, which is determined according to the engine rotational speed NMO_ZG in the target gear with the addition of another presettable amount PST_OFF1, it is recognized that also after a downshift to the target gear traction operation certainly exists.

Therefore, if these two conditions are met, a time T is started and the driving activity characteristic FAKG is increased by a presettable offset amount UDC. With the then existing actual value FAKG of the driving activity characteristic, actual shift rotational speeds are determined by interpolation between shifting characteristic lines from two respectively adjacent shift programs, a simple or double downshift being triggered as a rule.

In one interrogation block (interrogation 3) is tested whether the timer T indicates that a presettable time TMAX has elapsed since the increase of the driving activity characteristic, whether an upshift HS was called for, or whether the actual pedal position PST is lower by a presettable amount PST_OFF2 than the actual value of the limit value KL_KSS whereby a coast operation can safely be recognized. This interrogation runs until at least one of the conditions has been met whereupon the driving activity characteristic FAKG is again increased by a presettable offset amount UDC by which it had been formerly increased.

Other developments of the invention are conceivable in addition to the embodiment described with reference to the figure.

It is possible in particular, instead of the accelerator pedal position, to find one other signal such as a throttle valve position for the load input by the driver. It is also possible to deactivate the driver type evaluation, the result of which is the driving activity characteristic, while the function is active, i.e. while the driving activity characteristic has been increased by the presettable offset, so that after the briefly increased traction requirement by the driver the original shift program is again returned to. The reverse case in which the driver type evaluation follows in the background is, of course, possible also.

| References | |
|---|---|
| PST | pedal position |
| KL_ZSS | traction-coast characteristic line |
| MNO | engine rotational speed |
| ADIFF | variable depending on road gradient |
| PSTG | accelerator pedal position gradient |
| KL_PSTG | limit value |
| MNO_ZG | engine rotational speed in the target gear |
| PSTG_OFF | offset on traction-coast characteristic line |
| PST_OFF1 | offset on traction-coast characteristic line |
| T | timer |
| FAKG | driving activity characteristic |
| UDC | offset amount |
| TMAX | maximum value of the T timer |
| PST_OFF2 | offset on traction-coast characteristic line |

What is claimed is:

1. A method of controlling an automatic transmission, controlled by an electronic control unit, the electronic control unit having stored therein several shift programs which are associated with certain values of a driving activity characteristic (FAKG), with each shift program shift characteristic line being determined by an accelerator pedal position and a shift rotational speed, the method comprising the steps of:

determining an accelerator pedal position gradient (PSTG) from an accelerator pedal position signal (PST);

immediately changing the shift rotational speed to a higher rotational speed when the accelerator pedal position gradient (PSTG), upon a quick depression of the accelerator pedal, exceeds a presettable limit value (KL_PSTG);

determining an actual shift rotational speed, depending upon an actual value of the driving activity characteristic, by interpolation between shift characteristic lines of two respectively adjacent shift programs; and immediately increasing the driving activity characteristic (FAKG) by a presettable offset amount (UDC) when the accelerator pedal position gradient (PSTG) exceeds the presettable limit value (KL_PSTG).

2. The method according to claim 1, further comprising the steps of recognizing in the electronic control unit, according to the accelerator pedal position, a traction operation and a coast operation, and increasing the driving activity characteristic (FAKG) by the presettable offset amount (UDC) only when an end of the quick depression of the accelerator pedal position (PST) is recognized.

3. The method according to claim 1, further comprising the steps of precalculating in the electronic control unit whether a downshift would be triggered if the driving activity (FAKG) were increased by the presettable offset amount (UDC) and what target gear (ZG) would be introduced after the downshift, and increasing the driving activity characteristic (FAKG) by the presettable offset amount (UDC) only when a traction operation is recognized with certainly, in the target gear (ZG), and when an end of the quick depression of the accelerator pedal position (PST) is recognized.

4. The method according to claim 2, further comprising the step of recognizing the end of the quick depression of the accelerator pedal position (PST) when the accelerator pedal position (PSTG) is lower than the limit value (KL_PSTG) by a presettable amount (PSTG_OFF).

5. The method according to claim 1, further comprising the step of, after the driving activity characteristic (FAKG) has been increased by the presettable offset amount (UDC), again reducing the driving activity characteristic (FAKG) by a same offset amount (UDC) when the actual accelerator pedal position (PST) is lower than the accelerator pedal position, that was reached at the end of a quick depression, by a certain amount when one of: (1) a coast operation is recognized with certainty, and (2) when a presettable time (TMAX) has elapsed since the increase in the driving activity characteristic.

6. The method according to claim 1, further comprising the step of, after the driving activity characteristic (FAKG) was increased by the presettable offset amount (UDC), again reducing the driving activity characteristic (FAKG) by a same offset amount (UDC) when one of: (1) an upshift (HS) is required, (2) when a coast operation is recognized with certainty, and (3) when a presettable time (TMAX) elapses since the increase of the driving activity characteristic.

7. The method according to claim 5, further comprising the step of depending the presettable time (TMAX) upon an actual value of the driving activity characteristic (FAKG).

8. The method according to claim 1, further comprising the step of depending the offset amount (UDC) upon an actual value of the driving activity characteristic (FAKG).

9. The method according to claim 1, further comprising the step of depending the offset amount (UDC) upon a determined value of the accelerator pedal position gradient (PSTG).

10. The method according to claim 1, further comprising the step of depending the limit value of the accelerator pedal position gradient (KL_PSTG) upon an actual value of the accelerator pedal position (PST).

11. The method according to claim 3 further comprising the steps of recognizing a traction operation with certainty when the accelerator pedal position (PST) is higher than a traction-coast characteristic line (KL_ZSS) by a presettable amount (PST_OFF1), and recognizing a coast operation with certainty when the accelerator pedal position (PST) is lower than the traction-coast characteristic line (KL_ZSS) by a presettable amount (PST_OFF2).

* * * * *